C. W. FREDERICK AND F. E. ALTMAN.
PHOTOGRAPHIC OBJECTIVE.
APPLICATION FILED DEC. 2, 1916.
1,309,847.  Patented July 15, 1919.
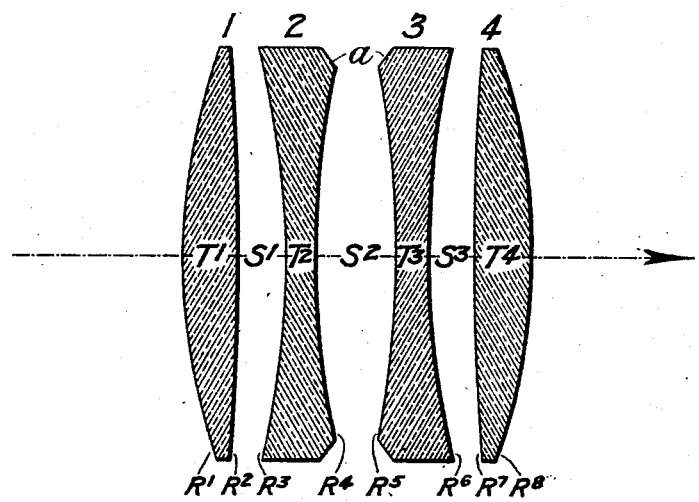
WITNESSES:
INVENTORS
Charles W. Frederick
and Fred E. Altman.
BY
ATTORNEY

UNITED STATES PATENT OFFICE.

CHARLES W. FREDERICK AND FRED E. ALTMAN, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC OBJECTIVE.

1,309,847.   Specification of Letters Patent.   Patented July 15, 1919.

Application filed December 2, 1916. Serial No. 134,733.

*To all whom it may concern:*

Be it known that we, CHARLES W. FREDERICK and FRED E. ALTMAN, of Rochester, in the county of Monroe and State of New York, have invented certain new and useful Improvements in Photographic Objectives; and we do hereby declare the following to be a full, clear, and exact description of the same, reference being had to the accompanying drawing, forming a part of this specification, and to the reference characters marked thereon.

Our invention relates to a lens structure and more particularly to an objective to be used in photography, and has for an object the provision of a four lens system which is especially corrected for coma, as well as other lens aberrations, and yet is so simple in structure with reference to its dimensions of curvature, thickness and spacing that two of the separate lenses may be ground by a single grinding tool while the other two lenses may be interchangeable and require but two grinding curvatures, so that the objective may be easily and cheaply manufactured and assembled.

To this and other objects, as will readily appear from the following disclosure, our invention consists in certain improvements and combination of parts clearly described in the specification and pointed out in the appended claims.

In a four lens air spaced system comprising two inner double concave negatives and two outer double convex positives, the effort is constantly made to simplify the structure so as to cut down costs of manufacture and assembling, this being most readily accomplished by making as many surfaces as possible of the same radius of curvature. This, however, introduces certain lens errors, especially coma, which are inherent in a simplified and symmetrical system.

In the practice of our invention and in accordance with the principles which we have discovered and which are involved in the objective described herein, we are able to make a lens system of this type which is adjusted for coma as well as the other lens errors and is a highly satisfactory lens for photographic work. A specific embodiment of our invention may involve a lens that is symmetrical to a large degree, comprising, as described below, two inner negatives which are geometrically alike in thicknesses and have but a single radius of curvature, and two outer positives, which are alike in curvatures, thickness, and glass and differ only in their reversed positioning in the system. Furthermore, in such a system it is even feasible to space the outer positive lenses equidistant from the adjacent negatives.

In adjusting for the error of coma, we must render the system unsymmetrical in some respect, although we have imposed on it the limitation that the negatives and positives be respectively symmetrical in form. We, however, find that satisfactory adjustments for coma may be made if we render the system, not geometrically, but optically unsymmetrical. In accordance therewith, we select for the negatives different glasses which have such optical properties that coma will be found substantially eliminated when the dimensions of the lens system have been determined upon for the desired results.

In the drawing, the figure is a diagrammatic exaggerated view of a lens system constructed in accordance with and illustrating one embodiment of our invention. In the system shown and described, the line of sight passes from left to right as indicated by the arrow in the figure, the positive, double convex lens 1 being the front lens of the objective. This positive lens 1 which has surfaces of unequal curvature, the greater one being in front, is made of crown glass of high refractive index and is separated by a small air space from a negative, double concave lens 2, preferably of flint glass. This negative lens 2 has both its curved faces ground to the same radius of curvature, and is entirely alike in its outer form and thickness with another negative lens 3, which is made of flint glass of a much lower refractive index than the other lenses. In the rear of this lens is a positive lens 4 of the same glass as the first positive and equal in every dimension therewith but reversed in position so that its surface of greater curvature faces rearwardly. The positive lenses are of equal thickness and spaced equidistant from the negative lenses. The negative lenses may be beveled at *a* on their inner edges to permit insertion into the usual type of lens cell.

In the accompanying table setting forth one form of our lens system, the numerical measurements are given in fractions of the focal length, so that by a simple multiplication of these values by the required focal length, whether given in inches, millimeters, or other units we arrive at the data for the corresponding lens calculated in the same units of measurement as the focal length:

Table.

| Lenses. | Glass. | Radii. | Thicknesses and separations. |
|---|---|---|---|
| (1) Positive | $G=1.62448$ $D=1.61088$ | $R_1=0.2499$ $R_2=0.7946$ | $T_1=0.0212$ |
|  |  |  | $S_1=0.0189$ |
| (2) Negative | $G=1.62348$ $D=1.60534$ | $R_3=0.3988$ $R_4=0.3988$ | $T_2=0.0106$ |
|  |  |  | $S_2=0.0325$ |
| (3) Negative | $G=1.57116$ $D=1.55613$ | $R_5=0.3988$ $R_6=0.3988$ | $T_3=0.0106$ |
|  |  |  | $S_3=0.0189$ |
| (4) Positive | $G=1.62448$ $D=1.61088$ | $R_7=0.7946$ $R_8=0.2499$ | $T_4=0.0212$ |

In the above table, the radii, thicknesses, separations, and refractive indices of the lenses illustrated are particularly set forth, $R_1$, $R_2$, etc., representing the radii, $T_1$, $T_2$, etc., the thicknesses of the lenses, $S_1$, $S_2$, etc., the thicknesses of the air spaces between the lenses, the successive characteristics being identified by subscript numerals ascending from left to right, in accordance with the reference characters on the drawing. In the table G is the index of refraction of the glass for the hydrogen blue or G′ line of the spectrum, while D represents the index of refraction for the sodium yellow or D line.

The glass of negative lens 2 may have the same refractive index for the G′ line of the spectrum as the positive lenses in accordance with our invention. However, in the specific system set forth herein, the glass differs slightly from the positive crown glass in its refractive index, owing to manufacturing variations in reproducing a glass formula. Important features in our objective are that the negatives differ in their optical properties in such a manner that the system is unbalanced and the proper adjustments for coma may be made, and that when corrections are made for spherical aberration, the curved surfaces of the negatives are equal in radii of curvature. By utilizing the principles of our invention, we obtain a lens that is of large covering power, adjusted not only for coma, but also for spherical and chromatic aberrations, astigmatism, curvature of field and distortion.

Having thus described our invention, what we claim as new and desire to cover by U. S. Letters Patent is:

1. In a lens system, the combination with two positive lenses, of two negative lenses which are geometrically symmetrical but optically unsymmetrical the constants of the system being so chosen that the system is adjusted for coma.

2. In a four lens objective, the combination with two identical positive lenses of two different negative lenses, the constants of the objective being such that the objective is corrected for coma.

3. In a four lens objective, the combination with two geometrically and optically symmetrical positive lenses, of two optically unsymmetrical negative lenses, the constants of the objective being such that the objective is adjusted for coma.

4. In an objective, the combination with two positive lenses geometrically and optically symmetrical, of two negative lenses geometrically symmetrical but optically unsymmetrical, the constants of the objective being such that the objective is substantially free from coma.

5. In an objective, the combination with two positive lenses, of two geometrically symmetrical but optically unsymmetrical negative lenses, the constants of the objective being such that the objective is adjusted for coma.

6. In a four lens objective, the combination with a pair of outer geometrically similar positive lenses of a pair of inner geometrically similar negative lenses, the lenses of one of said pairs being of different glass.

7. In a four lens objective, the combination with a pair of outer geometrically similar positive lenses of a pair of inner geometrically similar negative lenses, both lenses of one of said pairs being of the same glass, and the lenses of the other pair being of different glass.

8. A photographic objective, comprising four air-spaced lenses, the two outer lenses being geometrically and optically similar positive lenses composed of glass of low dispersive power, the two inner lenses being dissimilar negative lenses composed of glass of high dispersive power, the constants of the objective being such that the objective is corrected for coma.

9. A spherically, chromatically, astigmatically and comatically corrected objective, consisting of four simple lenses separated from one another by air spaces, and arranged in two halves, each half comprising an outer positive lens and an inner negative lens, the two lenses being separated by an air space in the shape of a positive meniscus, the positive lenses in each half having the same radii of curvature and placed with the less curved surface facing inward toward the median plane of the lens, and being made of the same crown glass and the negative lenses being made of different kinds of flint glass.

10. In a four lens, air spaced objective, the combination with two positive lenses having their outer and inner surfaces respectively equal in radii of curvature, of two negative lenses having all four curved faces of the same radius of curvature, the glasses of said negative lenses having different indices of refraction, the constants of the objective being so related that the objective is adjusted for coma as well as other lens errors.

11. In a photographic objective, a four lens air spaced system comprising the combination with two positive lenses of the same glass and thickness, in each of which the outer surface has a shorter radius of curvature than the inner surface, the outer surfaces and the inner surfaces of the two lenses being respectively of the same curvature, of two negative lenses equally spaced between said positive lenses and having the same thicknesses and all curved surfaces of the same radius of curvature, the glass of one negative lens differing in refractive index from that of the other lens, the constants of the lens system being so chosen that the system is adjusted for coma as well as spherical and chromatic aberrations, astigmatism, curvature of field and distortion.

12. A four lens, air spaced, photographic objective comprising front and rear bi-convex lenses, each having a thickness of approximately 0.021 and radii of curvature of approximately 0.250 and 0.795, and two bi-concave lenses, air spaced from each other and from the biconvex lenses, the radius of curvature of each surface of each bi-concave lens being approximately 0.399, and the thickness of each being approximately 0.011, the bi-convex lenses, the front bi-concave lens and the rear bi-concave lens being made of glass having indices of refraction of approximately 1.624; 1.624 and 1.571 respectively for the hydrogen blue line of the spectra; and of approximately 1.611; 1.605 and 1.556 respectively for the sodium yellow line; the said lenses being separated from front to rear by the distances of approximately 0.019, 0.032 and 0.019 respectively, all dimensions being calculated in decimals of the focal length of the objective.

In witness whereof, we hereunto subscribe our signatures in the presence of two witnesses this 1st day of December 1916.

CHARLES W. FREDERICK.
FRED E. ALTMAN.

Witnesses:
HELEN M. FRASER,
GILBERT S. DEY.

Copies of this patent may be obtained for five cents each, by addressing the "Commissioner of Patents Washington, D. C."